US006618099B1

(12) United States Patent
Spitzer

(10) Patent No.: US 6,618,099 B1
(45) Date of Patent: Sep. 9, 2003

(54) DISPLAY DEVICE WITH EYEPIECE ASSEMBLY AND DISPLAY ON OPTO-MECHANICAL SUPPORT

(75) Inventor: Mark B. Spitzer, Sharon, MA (US)

(73) Assignee: The Microoptical Corporation, Westwood, MA (US)

( * ) Notice: Subject to any disclaimer, the term of this patent is extended or adjusted under 35 U.S.C. 154(b) by 0 days.

(21) Appl. No.: 09/588,674

(22) Filed: Jun. 7, 2000

Related U.S. Application Data

(60) Provisional application No. 60/140,340, filed on Jun. 21, 1999, and provisional application No. 60/140,707, filed on Jun. 24, 1999.

(51) Int. Cl.⁷ ............................................. G02F 1/1335
(52) U.S. Cl. ......................................... 349/13; 359/630
(58) Field of Search ..................... 349/13, 15

(56) References Cited

U.S. PATENT DOCUMENTS

| | | | |
|---|---|---|---|
| D195,365 S | 6/1963 | Holt | D57/1 |
| 3,192,826 A | 7/1965 | Papke | 88/1.5 |
| 3,216,308 A | 11/1965 | Northcutt | 88/1 |
| 3,229,580 A | 1/1966 | Mitchell | 88/86 |
| 3,524,710 A | 8/1970 | Rickert | 356/251 |
| 3,610,825 A | 10/1971 | Fritzel | 178/7.8 |
| 3,744,049 A | 7/1973 | Luce | 340/336 |

(List continued on next page.)

FOREIGN PATENT DOCUMENTS

| | | | |
|---|---|---|---|
| DE | 22 05 325 C2 | 4/1973 | 356/251 |
| EP | 0 344 881 A2 | 12/1989 | |
| EP | 0 535 402 A1 | 4/1993 | |
| EP | 0 871 054 A2 | 10/1998 | |
| GB | 301672 | 12/1928 | 350/286 |
| WO | WO 98/15868 | 4/1998 | |
| WO | WO 99/23524 | 5/1999 | |
| WO | WO 99/23525 | 5/1999 | |

OTHER PUBLICATIONS

*Real–Time American Sign Language Recognition: Using Desk and Wearable Computer Based Video*, Thad Starner et al., Perpetual Computing TR#466, MIT Media Lab., to appear IEEE PAMI '98, submitted Apr. 26, 1996.

'*WearCam* '(*The Wearable Camera*): *Personal Imaging Systems for long–term use in wearable tetherless computer–mediated reality and personal Photo/Videographic Memory Prosthesis*, Steve Mann, Digest of Papers of the Second International Symposium on Wearable Computers, Oct. 19–20, 1998, Pittsburgh, PA, pp. 124–131, sponsored by IEEE Computer Society Task Force on Wearable Information Systems.

*Video I/O interface for wearable computers*, M.B. Spitzer et al., Proceedings of SPIE Conference 3689, Helmet and Head–Mounted Displays IV, Orlando, Florida, Apr. 5 and 6, 1999.

"The Wearable PC, Wired for wear: IBM researchers demonstrate a wearable ThinkPad Prototype", www.ibm.com/News/Is/1998/09/jp–3.phtml.

(List continued on next page.)

*Primary Examiner*—Robert H Kim
*Assistant Examiner*—T L Rude
(74) *Attorney, Agent, or Firm*—Weingarten, Schurgin, Gagnebin & Lebovici LLP

(57) ABSTRACT

A compact, head-mountable display device for transmitting an image to a user's eye is provided. The display device includes a support fixture comprising an elongated member configured to allow passage of ambient light across a direction of elongation of the elongated member to a user's eye. A display, such as an LCD, is supported by the support and is operative to provide an image. An eyepiece assembly is supported by the support fixture in proximity to the display to receive the image from the display and to direct the image to the user's eye. The support fixture also defines an illumination path along the elongated member, and the display is located to receive illumination light on the illumination path from a light source.

82 Claims, 12 Drawing Sheets

U.S. PATENT DOCUMENTS

| | | | | |
|---|---|---|---|---|
| 3,787,109 | A | 1/1974 | Vizenor | 350/302 |
| 3,885,095 | A | 5/1975 | Wolfson et al. | 178/7.88 |
| 3,915,548 | A | 10/1975 | Opittek et al. | 350/3.5 |
| 3,923,370 | A | 12/1975 | Mostrom | 350/55 |
| 3,936,605 | A | 2/1976 | Upton | 179/1 SP |
| 3,940,204 | A | 2/1976 | Withrington | 350/3.5 |
| RE28,847 | E | 6/1976 | Vizenor | 350/302 |
| 4,052,073 | A | 10/1977 | Miller | 273/148 R |
| 4,082,432 | A | 4/1978 | Kirschner | 350/174 |
| 4,195,915 | A | 4/1980 | Lichty et al. | 350/345 |
| 4,218,111 | A | 8/1980 | Withrington | 350/3.72 |
| 4,447,128 | A | 5/1984 | Ferrer | 350/174 |
| 4,550,984 | A | 11/1985 | Reymond | 350/404 |
| 4,649,434 | A | 3/1987 | Weinblatt | 358/250 |
| 4,664,475 | A | 5/1987 | Ferrer | 350/174 |
| 4,665,385 | A | 5/1987 | Henderson | 340/539 |
| 4,704,000 | A | 11/1987 | Pekar et al. | 350/145 |
| 4,722,601 | A | 2/1988 | McFarlane | 356/152 |
| 4,751,691 | A | 6/1988 | Perera | 368/10 |
| 4,753,514 | A | 6/1988 | Kubik | 350/174 |
| 4,799,765 | A | 1/1989 | Ferrer | 350/174 |
| 4,806,001 | A | 2/1989 | Okabe et al. | 350/432 |
| 4,806,011 | A | 2/1989 | Bettinger | 351/158 |
| 4,818,048 | A | 4/1989 | Moss | 350/3.7 |
| 4,826,287 | A | 5/1989 | Cook et al. | 350/174 |
| 4,852,988 | A | 8/1989 | Velez et al. | 351/210 |
| 4,853,306 | A | 8/1989 | Wreede et al. | 430/1 |
| 4,867,551 | A | 9/1989 | Perera | 351/158 |
| 4,869,575 | A | 9/1989 | Kubik | 350/174 |
| 4,902,083 | A | 2/1990 | Wells | 350/6.6 |
| 4,934,773 | A | 6/1990 | Becker | 350/6.6 |
| 4,961,626 | A | 10/1990 | Fournier et al. | 350/174 |
| 4,968,117 | A | 11/1990 | Chern et al. | 350/162.24 |
| 4,973,132 | A | 11/1990 | McDonald et al. | 350/174 |
| 4,973,139 | A | 11/1990 | Weinhrauch et al. | 350/345 |
| 5,003,300 | A | 3/1991 | Wells | 340/705 |
| 5,013,134 | A | 5/1991 | Smith | 350/174 |
| 5,028,119 | A | 7/1991 | Hegg et al. | 350/174 |
| 5,044,709 | A | 9/1991 | Smith et al. | 359/13 |
| 5,050,962 | A | 9/1991 | Monnier et al. | 359/13 |
| 5,053,755 | A | 10/1991 | Smith et al. | 340/705 |
| 5,128,783 | A | 7/1992 | Abileah et al. | 349/162 |
| 5,129,716 | A | 7/1992 | Holakovszky et al. | 351/50 |
| 5,138,470 | A | 8/1992 | Moss et al. | 359/13 |
| 5,162,828 | A | 11/1992 | Furness et al. | 353/122 |
| 5,184,250 | A | 2/1993 | Lacroix | 359/631 |
| 5,212,471 | A | 5/1993 | McDonald | 340/705 |
| 5,214,425 | A | 5/1993 | Wreede | 340/980 |
| 5,231,379 | A | 7/1993 | Wood et al. | 340/705 |
| 5,281,957 | A | 1/1994 | Schoolman | 345/8 |
| 5,281,960 | A | 1/1994 | Dwyer, III | 345/31 |
| 5,309,169 | A | 5/1994 | Lippert | 345/8 |
| 5,320,538 | A | 6/1994 | Baum | 434/307 |
| 5,325,386 | A | 6/1994 | Jewell et al. | 372/50 |
| 5,334,991 | A | 8/1994 | Wells et al. | 345/8 |
| 5,348,477 | A | 9/1994 | Welch et al. | 434/43 |
| 5,359,669 | A | 10/1994 | Shanley et al. | 382/6 |
| 5,367,345 | A | 11/1994 | daSilva | 351/123 |
| 5,369,415 | A | 11/1994 | Richard et al. | 345/6 |
| 5,381,267 | A | 1/1995 | Woody | 359/632 |
| 5,384,654 | A | 1/1995 | Iba | 359/364 |
| 5,392,158 | A | 2/1995 | Tosaki | 359/633 |
| 5,416,876 | A | 5/1995 | Ansley et al. | 385/123 |
| 5,446,507 | A | 8/1995 | Chang | 351/158 |
| 5,455,591 | A | 10/1995 | Hui | 342/185 |
| 5,459,612 | A | 10/1995 | Ingleton | 359/630 |
| 5,469,185 | A | 11/1995 | Lebby et al. | 345/8 |
| 5,491,580 | A | 2/1996 | Gove | 348/77 |
| 5,506,728 | A | 4/1996 | Edwards et al. | 359/629 |
| 5,519,410 | A | 5/1996 | Smalanskas et al. | 345/7 |
| 5,519,533 | A | 5/1996 | Nomura et al. | 359/478 |
| 5,537,253 | A | 7/1996 | Cox et al. | 359/630 |
| 5,539,578 | A | 7/1996 | Togino et al. | 359/630 |
| 5,548,832 | A | 8/1996 | Karam | 455/226.4 |
| 5,576,887 | A | 11/1996 | Ferrin et al. | 359/631 |
| 5,579,148 | A | 11/1996 | Nishikawa et al. | 359/214 |
| 5,583,590 | A | 12/1996 | Clupper | 351/200 |
| 5,585,871 | A | 12/1996 | Linden | 351/158 |
| 5,589,846 | A | 12/1996 | Kobayashi | 345/8 |
| 5,596,339 | A | 1/1997 | Furness, III et al. | 345/8 |
| 5,596,451 | A | 1/1997 | Handschy et al. | 359/633 |
| 5,606,743 | A | 2/1997 | Vogt et al. | 455/347 |
| 5,610,765 | A | 3/1997 | Colucci | 359/633 |
| 5,626,410 | A | 5/1997 | Chambers et al. | 353/94 |
| 5,629,790 | A | 5/1997 | Neukermans et al. | 359/198 |
| 5,644,323 | A | 7/1997 | Hildebrand et al. | 345/8 |
| 5,648,789 | A | 7/1997 | Beadles et al. | 345/8 |
| 5,653,751 | A | 8/1997 | Samiy et al. | 623/4 |
| 5,654,827 | A | 8/1997 | Reichert | 359/631 |
| 5,654,828 | A | 8/1997 | Togino et al. | 359/633 |
| 5,671,037 | A | 9/1997 | Ogasawara et al. | 351/158 |
| 5,673,139 | A | 9/1997 | Johnson | 359/291 |
| 5,682,173 | A | 10/1997 | Holakovszky et al. | 345/8 |
| 5,699,194 | A | 12/1997 | Takahashi | 359/633 |
| 5,701,202 | A | 12/1997 | Takahashi | 359/631 |
| 5,712,649 | A | 1/1998 | Tosaki | 345/8 |
| 5,717,479 | A | 2/1998 | Rickards | 351/158 |
| 5,719,588 | A | 2/1998 | Johnson | 345/8 |
| 5,726,739 | A | 3/1998 | Hayata | 355/67 |
| 5,744,788 | A | 4/1998 | Metlitsky et al. | 235/454 |
| 5,751,493 | A | 5/1998 | Hur | 359/630 |
| 5,757,348 | A | 5/1998 | Handschy et al. | 345/89 |
| 5,808,589 | A | 9/1998 | Fergason | 345/8 |
| 5,815,326 | A | 9/1998 | Takahashi | 359/729 |
| 5,844,824 | A | 12/1998 | Newman et al. | 364/708.1 |
| 5,880,888 | A | 3/1999 | Schoenmakers et al. | 359/631 |
| 5,886,822 | A | 3/1999 | Spitzer | 359/630 |
| 5,896,438 | A | 4/1999 | Miyake et al. | 378/34 |
| 5,911,010 | A | 6/1999 | Nakajima | 382/239 |
| 5,943,171 | A | 8/1999 | Budd et al. | 359/631 |
| 5,973,692 | A | 10/1999 | Knowlton et al. | 345/348 |
| 5,973,845 | A | 10/1999 | Hildebrand et al. | 359/630 |
| 5,991,103 | A | 11/1999 | Togino | 359/834 |
| 6,005,536 | A | * 12/1999 | Beadles et al. | 345/7 |
| 6,005,720 | A | 12/1999 | Watters et al. | 359/633 |
| 6,023,253 | A | 2/2000 | Taniguchi et al. | 345/7 |
| 6,023,372 | A | 2/2000 | Spitzer et al. | 359/630 |
| 6,081,304 | A | 6/2000 | Kuriyama et al. | 348/838 |
| 6,091,546 | A | 7/2000 | Spitzer | 359/618 |
| 6,094,181 | A | 7/2000 | Hildebrand et al. | 345/8 |
| 6,140,983 | A | 10/2000 | Quanrud | 345/55 |
| 6,144,439 | A | 11/2000 | Carollo | 349/176 |
| 6,281,952 | B1 | 8/2001 | Okamoto et al. | 349/12 |
| 6,292,158 | B1 | 9/2001 | Amafuji et al. | 345/7 |
| 6,304,234 | B1 | 10/2001 | Horiuchi | 345/8 |

OTHER PUBLICATIONS

"Technical Prototype, See the specifications for IBM's new wearable PC Prototype", www.ibm.com/News/Is/1998/09/jp–4.phtm.

Albacomp Computers Corp., "Personal Monitor" brochure.

Ferrin, Frank J., "An update on optical systems for military head mounted displays", presented at SPIE's "AeroSense", Apr. 5–9, 1999, 8 pages.

Rotier, Donald J., "Optical Approaches to the Helmet Mounted Display", SPIE vol. 1116 Helmet–Mounted Displays (1989), pp. 14–18.

Ditlea, Steve, "Inside Big Blue", *Popular Mechnics*, Dec. '98, pp. 54–59.

"Mission Impossible: Video Glasses and Sunglasses, The Absolute Ultimate In Covert Video Surveillance", www.pimall.com/nais/e.vsunglass.html, Oct. 27, 1998, pp. 1–4.

* cited by examiner

TOP VIEW

DISPLAY DEVICE WITH EYEPIECE ASSEMBLY AND DISPLAY ON OPTO-MECHANICAL SUPPORT

CROSS REFERENCE TO RELATED APPLICATIONS

Applicant claims priority under 35 U.S.C. §119(e)of U.S. Provisional Applications Ser. No. 60/140,340 filed Jun. 21, 1999 entitled "Light Weight, Compact Eyepiece On A Post," and No. 60/140,707 filed Jun. 24, 1999 entitled "Light Weight, Compact Eyepiece On A Post," the disclosures of which are incorporated by reference herein.

STATEMENT REGARDING FEDERALLY SPONSORED RESEARCH OR DEVELOPMENT

N/A

BACKGROUND OF THE INVENTION

There are many examples of displays mounted on the head, sunglasses, eyeglasses and the like (for example Perera, U.S. Pat. No. 4,867,551). Perera describes a display mounted on eyeglasses, the limitation of which is the high degree of occlusion of the user's field of view beyond the display, and the use of non-axial optics that introduces distortion. Other companies, such as VirtualVision, provide displays that are suspended by a cable, gooseneck fixture or other mechanical support in front of one or both of the user's eyes. Similarly, students at the MIT Media Laboratory have been mounting displays from Reflection Technology on eyewear, in order to provide a computer display in a mobile fashion. These approaches also highly limit the user's view of the surroundings.

Generally, head-mounted and helmet-mounted display systems are based on miniature displays having a diagonal dimension of 4 cm or less. The display systems that use such miniature displays must provide a lens near the eye for magnification, and to make possible comfortable viewing at near distances. We term the lens and any other associated optics that must be placed near the eye the "eyepiece." Most prior art head-mounted systems also place the display (for example a miniature liquid crystal flat panel display) near the eye as well, which requires both a support fixture for the eyepiece, and a conduit for electrical cables to the display. These components (wires, liquid crystal display, illumination source and any other required circuits) are placed within an opaque housing near the eye. Consequently, such systems block a portion of the user's visual field, and also obscure the user's face. For liquid crystal displays, the illumination source accounts for a large amount of the volume of the eyepiece.

In a recent patent (U.S. Pat. No. 6,023,372), we described a method of supporting an eyepiece near the eye at the end of a transparent opto-mechanical structure (FIG. 1). Data or images are relayed to the device by a cable which may comprise wire, one or more optical fibers as described in U.S. Pat. No. 5,715,337, or a fiber optic coherent bundle image conduit. The advantage of this prior art approach is the low obscuration of the user's vision inherent in the use of a transparent opto-mechanical support for the eyepiece.

SUMMARY OF THE INVENTION

This invention comprises a new approach to a light weight, compact head-mounted display system that combines an image relay system and mechanical support with a simple mounting system that can be applied to eyeglasses or other head gear. The invention involves mounting of a display, such as a liquid crystal display, against an eyepiece at the end of a clear supporting structure, with illumination provided through a transparent opto-mechanical support fixture that suspends the eyepiece near the eye. The opto-mechanical support fixture may be like that described in U.S. Pat. No. 6,023,372, the disclosure of which is incorporated by reference herein. In an alternative embodiment, the invention involves mounting of the liquid crystal display against an eyepiece with a visually minimal opaque mechanical support, and with the illumination provided through free space. The device is particularly suitable for use as an interface to computers, personal digital assistants, and cellular telephones.

More particularly, the invention provides a compact, head-mountable display device for transmitting an image to a user's eye. The display device includes a support comprising an elongated member configured to allow passage of ambient light across a direction of elongation of the elongated member to a user's eye. A display, such as an LCD, is supported by the support and is operative to provide an image. An eyepiece assembly is supported by the support fixture in proximity to the display to receive the image from the display and to direct the image to the user's eye. The support also defines an illumination path along the elongated member, and the display is located to receive illumination light on the illumination path from a light source.

The invention is advantageous in that it permits the display to be located near the eyepiece, so that the eyepiece may have a shorter focal length and consequently provide higher magnification, and it allows the illumination source to be remote from the eyepiece and display. As can be seen in the drawings, the display itself is relatively low in volume, and in the case of an LCD is largely glass, and thus can be integrated in the eyepiece without a high degree of obscuration of the user's vision. Although the eyepiece has slightly greater obscuration than the prior art device in U.S. Pat. No. 6,023,372, the greater magnification obtainable from the shorter focal length of the eyepiece is an advantage that may be preferable in many applications.

DESCRIPTION OF THE DRAWINGS

The invention will be more fully understood from the following detailed description taken in conjunction with the accompanying drawings in which.

DETAILED DESCRIPTION OF THE INVENTION

Figure 1:
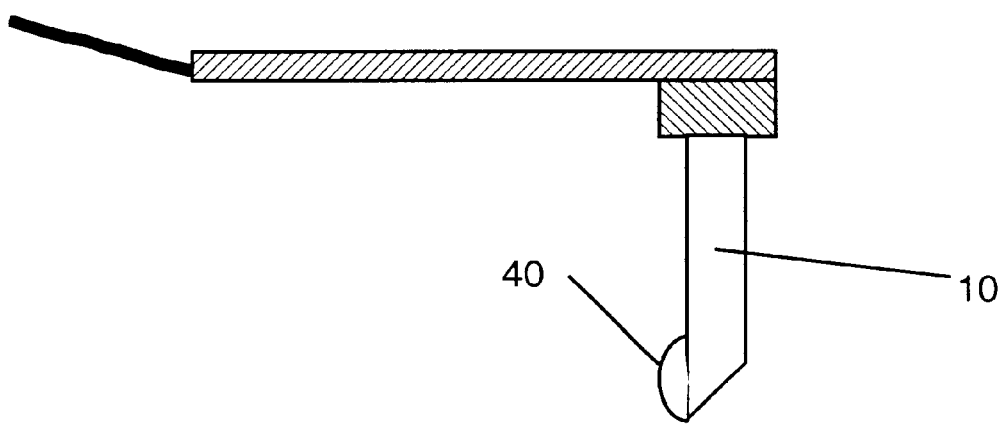
FIG. 1 illustrates a prior art opto-mechanical fixture.
Figure 2:
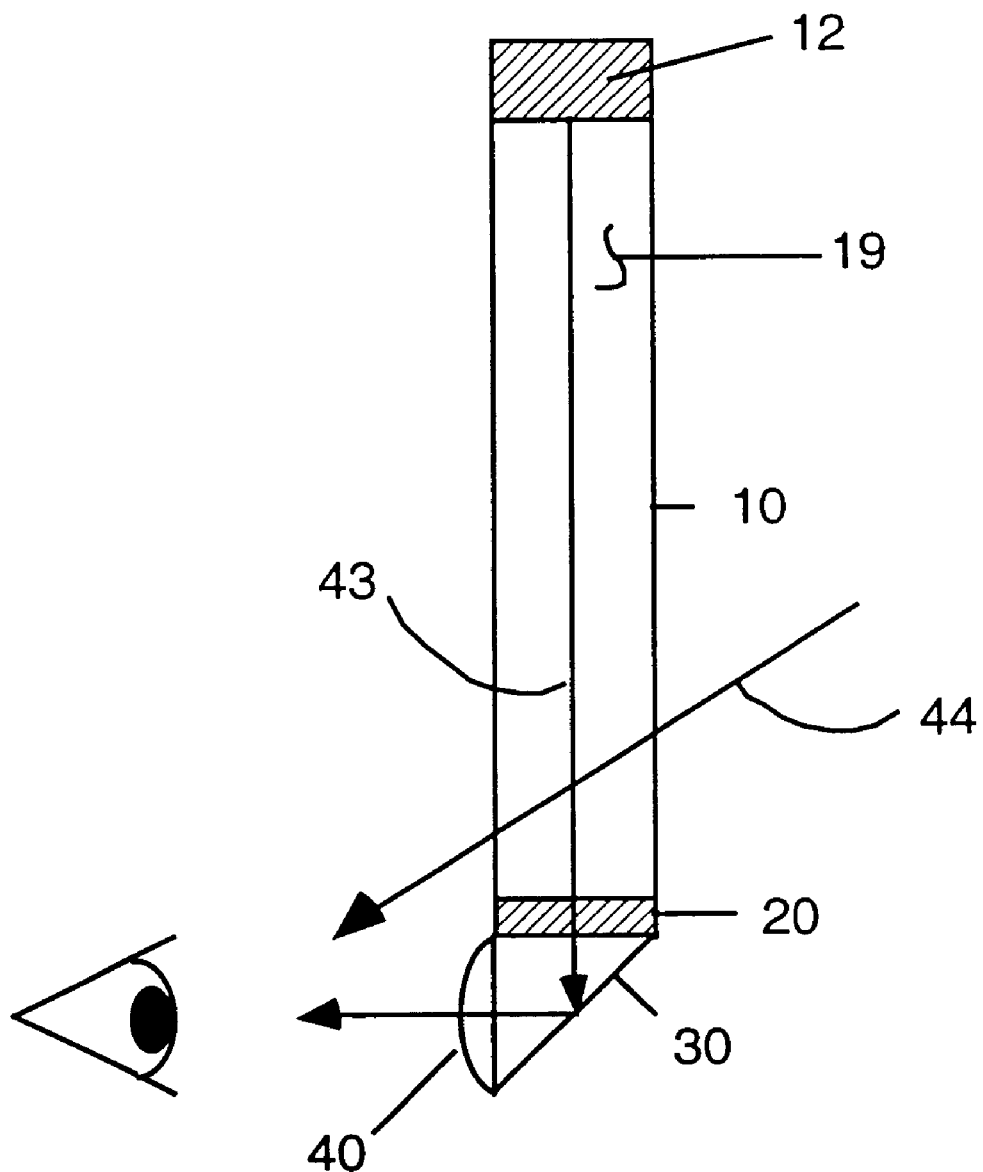
FIG. 2 is a schematic top view of an opto-mechanical support fixture with eyepiece and display according to the present invention.

FIG. 2 illustrates a first embodiment of the invention. A transmissive LCD 20, for example the Kopin Cyber Display P/N KCD-QM02-AA (consisting primarily of glass when the mechanical plastic housing is removed), is placed between a prism 30 and a clear mechanical support fixture 10, to which a light source 12 is attached. Light from the light source 12, indicated by the ray 43, is transmitted through the clear mechanical support fixture 10 and is incident on the back side of the LCD 20, which may comprise an active matrix LCD (AMLCD). The LCD modulates the light to form an image which is relayed to the eye of the observer by an eyepiece assembly, such as prism 30 and lens 40, which magnifies the image so that it can be conveniently viewed. The prism 30 may be metal-coated, or may be replaced by a mirror. Images of the ambient scene, indicated by ray 44, pass through support 10 to the eye of the user.

If the focal length of the lens 40 equals the optical distance between the lens and the LCD, the image is observed at infinity. Other focal lengths can be employed to place the image at the desired distance, in accordance with Newton's lens equation or its equivalents. The manner of conveying electrical signals to the LCD will be described herein later.

An advantage of this device is that the object plane (i.e. the LCD) is in proximity (within 5 to 20 mm) to the eyepiece, thus simplifying the optical relay and reducing the focal length of the eyepiece. The reduction in focal length increases the magnification of the system and produces a larger image.

In most of the drawings, only a single ray is shown for clarity, but it should be understood that the functioning of the invention requires a plurality of rays and optical paths. It should also be understood that when single lens surfaces are shown, they may represent a system of multiple lens surfaces. Additionally, for the exposition of the optical principles, only the essential optical elements are shown, but is to be understood that the associated housings, clamps and circuits that may or may not be shown can be applied to any of the optical designs.

A feature of this invention is the clear mechanical support fixture 10. The support fixture is clear for two reasons: so that illumination rays can be transmitted to the display, and so that the user's vision of rays 44 is not blocked by the support fixture.

Figure 3:
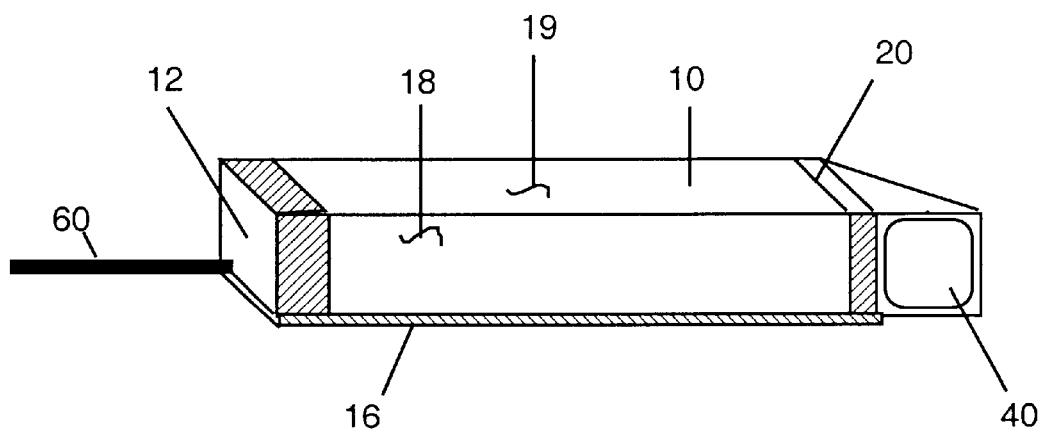
FIG. 3 is an isometric view of the opto-mechanical support fixture of FIG. 2.

FIG. 3 illustrates a perspective drawing of the embodiment of the invention shown in FIG. 2. The top surface 19 and bottom surface 17 (FIG. 11) of the support fixture 10 may be painted black and may be unpolished, since these surfaces are not in the view of the user (ambient rays do not pass through surfaces 17 and 19 to the eye). Alternatively, a thin plastic layer may be placed against surfaces 17, 19 for added mechanical strength or to hide circuits. Ambient rays 44 do pass through surface 18 and its opposite surface (not shown) and so surface 18 and its opposing surface should be clear, flat and smooth.

Figure 4:
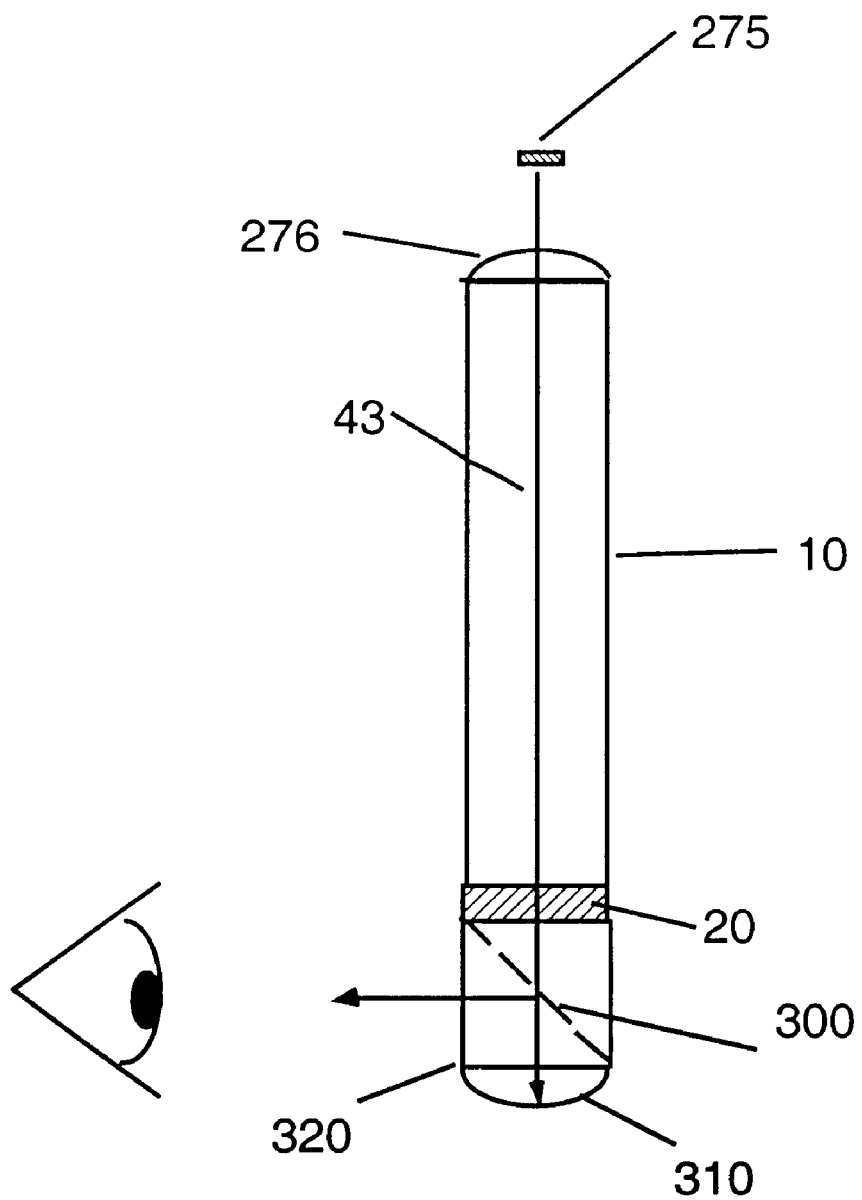
FIG. 4 is a schematic top view of a further embodiment of an opto-mechanical support fixture with eyepiece and display.

A see-through eyepiece may also be used in this invention, as shown in FIG. 4, which also shows a manner of collimation of the illumination light. An LED 275 provides light to a collimating lens 276 which, as indicated by ray 43, proceeds through the support fixture 10 to the LCD 20. Polarized light from the LCD passes polarization beam splitter 300 and quarter wave plate 320, and is then reflected by focusing mirror 310. Upon reflection, the light passes a second time through quarter wave plate 320. Having passed twice through the quarter wave plate, the polarization angle of the light is in a condition to be reflected at polarization beam splitter 300, and accordingly passes to the eye.

Figure 5:
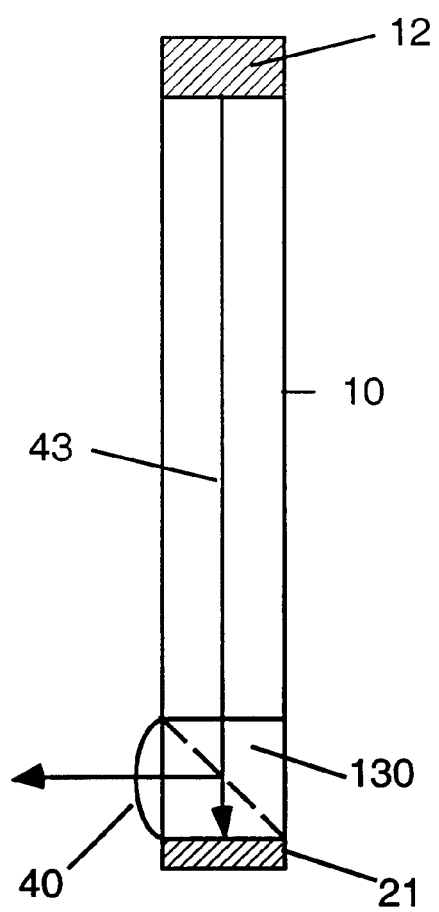
FIG. 5 is a schematic top view of a still further embodiment of an opto-mechanical support fixture with eyepiece and display.

In another embodiment shown in FIG. 5, a reflective LCD 21 is used. The reflective display is for example of the type manufactured by Microdisplay Corporation, of San Pablo, Calif. The prism shown in FIG. 2 is replaced by a polarization beam splitter cube 130 that serves as the polarizer and analyzer for the reflective LCD. Light from the illuminator 12, represented by rays 43, passes through the mechanical support 10 to the cube 130, and one linear polarization passes to the reflective LCD 21. The LCD 21 reflects and rotates the polarization of the incident light at each pixel in accordance with a control signal, so that the desired image is relayed to the eye through cube 130 and eye lens system 40.

In all of the foregoing embodiments, the length of the clear support 10 is independent of the focal length of the imaging optics, meaning that the length of support fixture 10 can be made large. A typical length of support fixture 10 is in the range of 1 to 10 cm. However, if the illumination is sufficiently bright or sufficiently collimated, the length may be increased, and the support may be curved, so that the illumination source may be placed behind the ear, and light may be relayed by support fixture 10 around the head from the ear to the eyepiece. If the curvature is properly designed, the light may be contained in a clear support fixture 10 by total internal reflection, similar in nature to the principals governing optical fiber.

Figure 6:
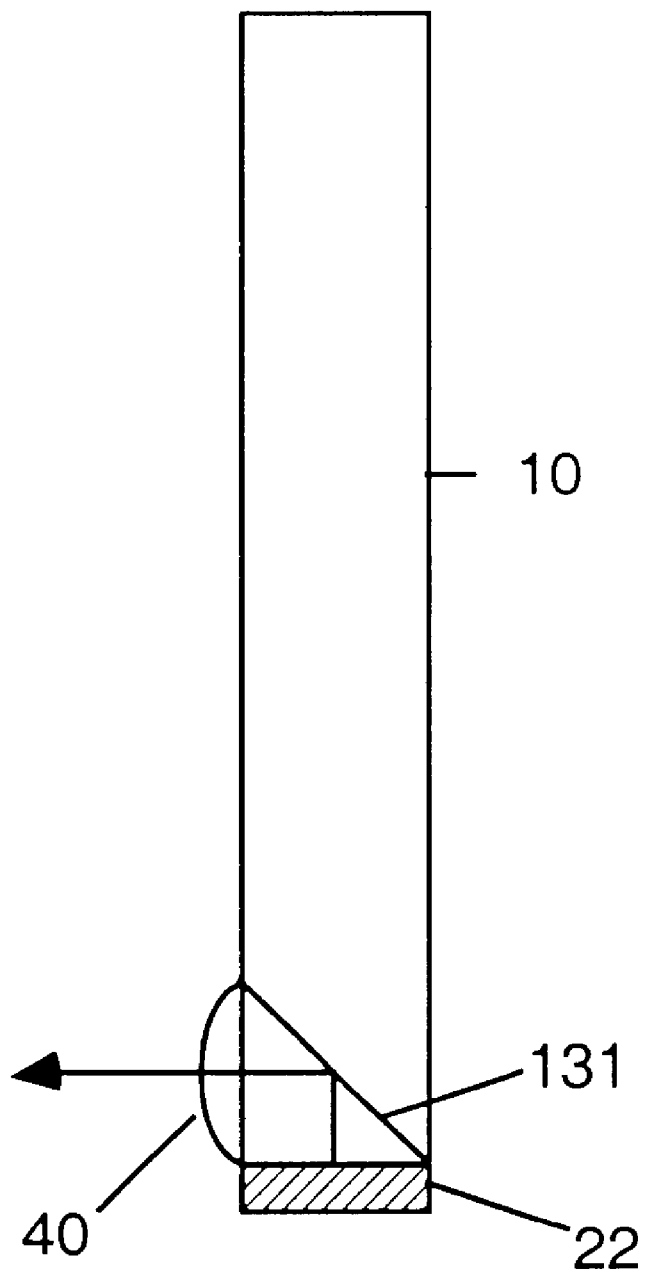
FIG. 6 is a schematic top view of a still further embodiment of an opto-mechanical support fixture with eyepiece and display.

In a further embodiment, an emissive display, such as an active matrix electroluminescent display of the type manufactured by Planar Corporation of Beaverton, Oreg., may be substituted for the reflective LCD. FIG. 6 shows how such a display is employed. The support fixture 10 is terminated in a wedge that has a mirror coating 131, to reflect light from the display 22 to the lens system 40. The clear mechanical support fixture permits the user to have a view free from obstructions of the mechanical features of the eyepiece support fixture, as indicated by ray 44, but in this embodiment does not relay light to the self-emissive display.

Figure 7:
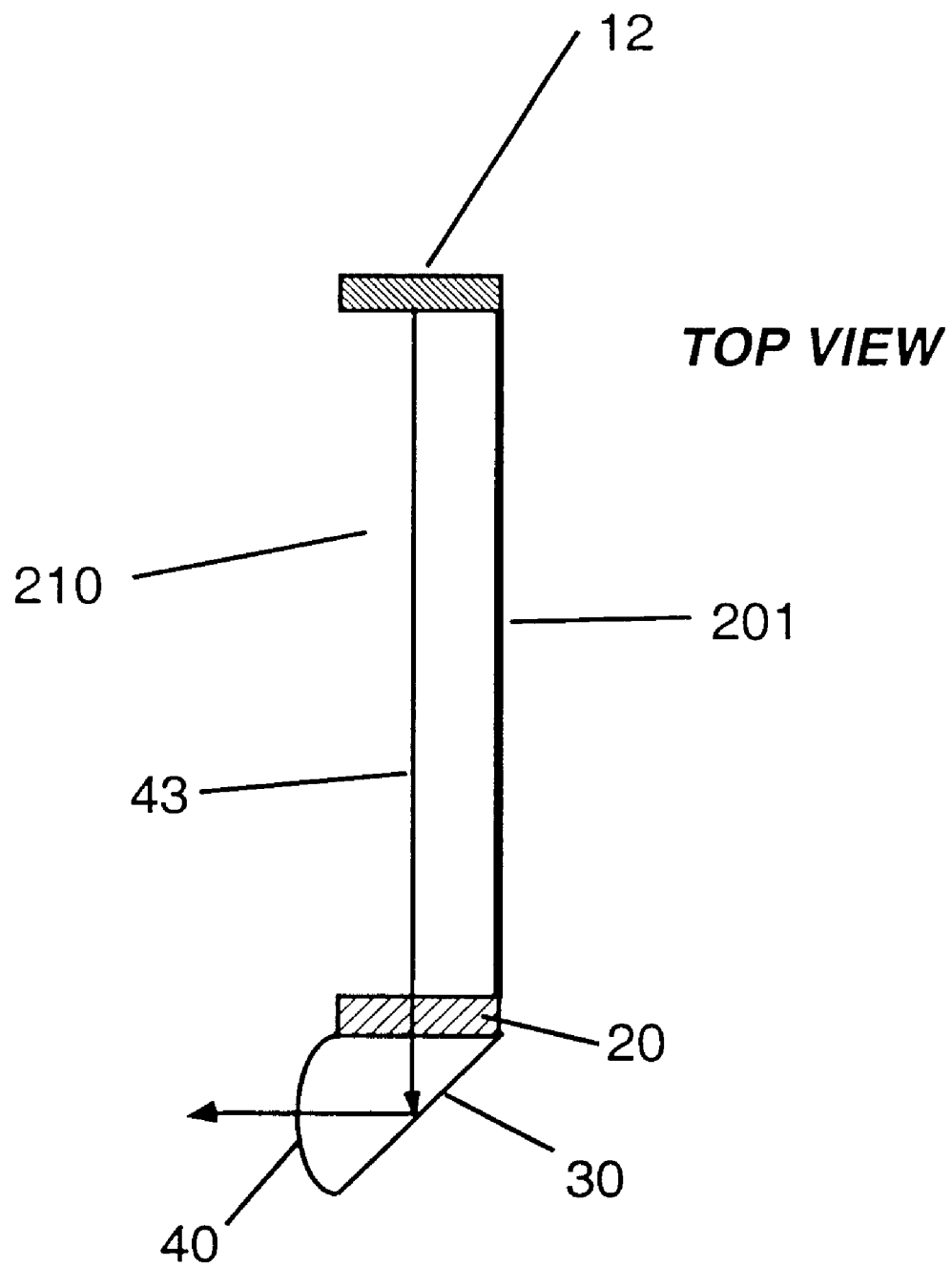
FIG. 7 is a schematic top view of a still further embodiment of an opto-mechanical support fixture with eyepiece and display.
Figure 8:
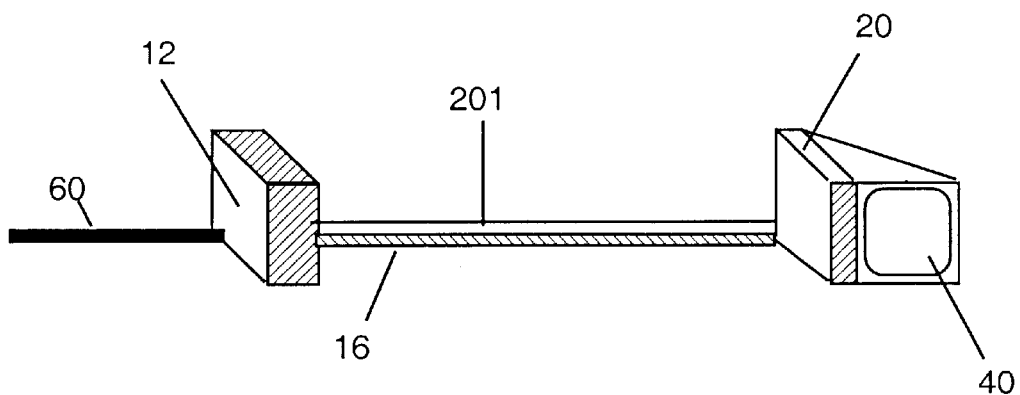
FIG. 8 is an isometric view of the opto-mechanical support fixture with eyepiece and display of FIG. 7.

Note that in another embodiment, the mechanical support fixture may be hollow, or may be reduced to a thin plate or post 201, as shown in FIGS. 7 and 8. In this embodiment, for the case of the LCD, the light 43 from the illumination source 12 may be conveyed to the LCD 20 in free space 210, along a straight path. The support structure 201 must however carry the electrical signals from cable 60 to the display, through a miniature cable 16 (FIG. 8). Such cables, comprising a plurality of micro-coaxial cables, are available from Gore.

Figure 9:
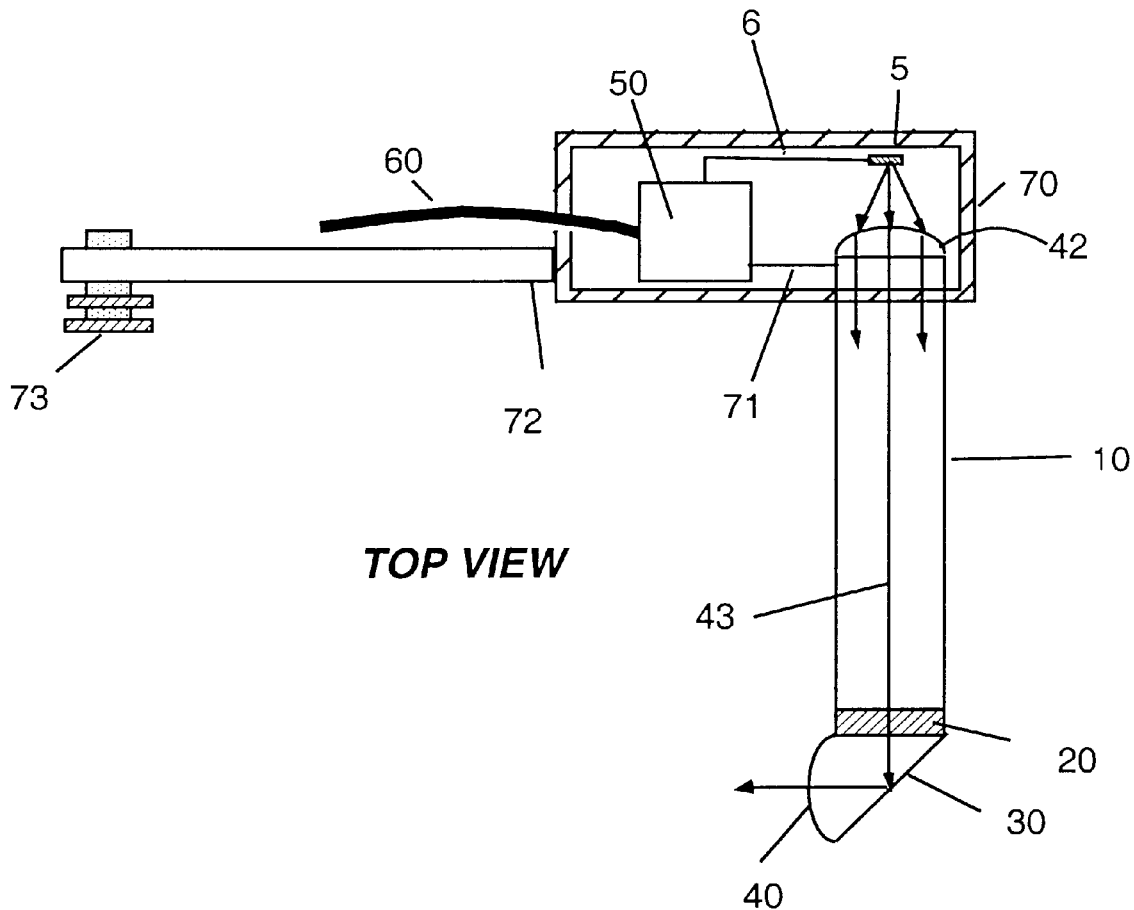
FIG. 9 is a schematic top view of the opto-mechanical support fixture and a housing containing circuits and illuminator with eyepiece and display with mounting fixture for mounting to a spectacle frame.

The devices shown in FIGS. 3–8 are intended to be mounted in front of one eye of the user by fixtures mounted to spectacle frames or to headbands. Two units can be used for viewing by two eyes. FIG. 9 shows a complete illustration of a system in accordance with this invention, intended for spectacle mounting. Signals are supplied to the unit by cable 60 that is anchored to housing 70. The housing 70 may contain integrated or discrete circuits 50 that are connected to the display by circuit 71. A second circuit 6 delivers power to LEDs 5. Illumination from LEDs 5 is incident on lens system 42, which collimates rays 43 that are transmitted to display 20 through support 10. Clamp 73 mounted on arm 72 serves to fix the unit to spectacles. A microphone (not shown) may be included within enclosure 70 for audio input.

Figure 10:
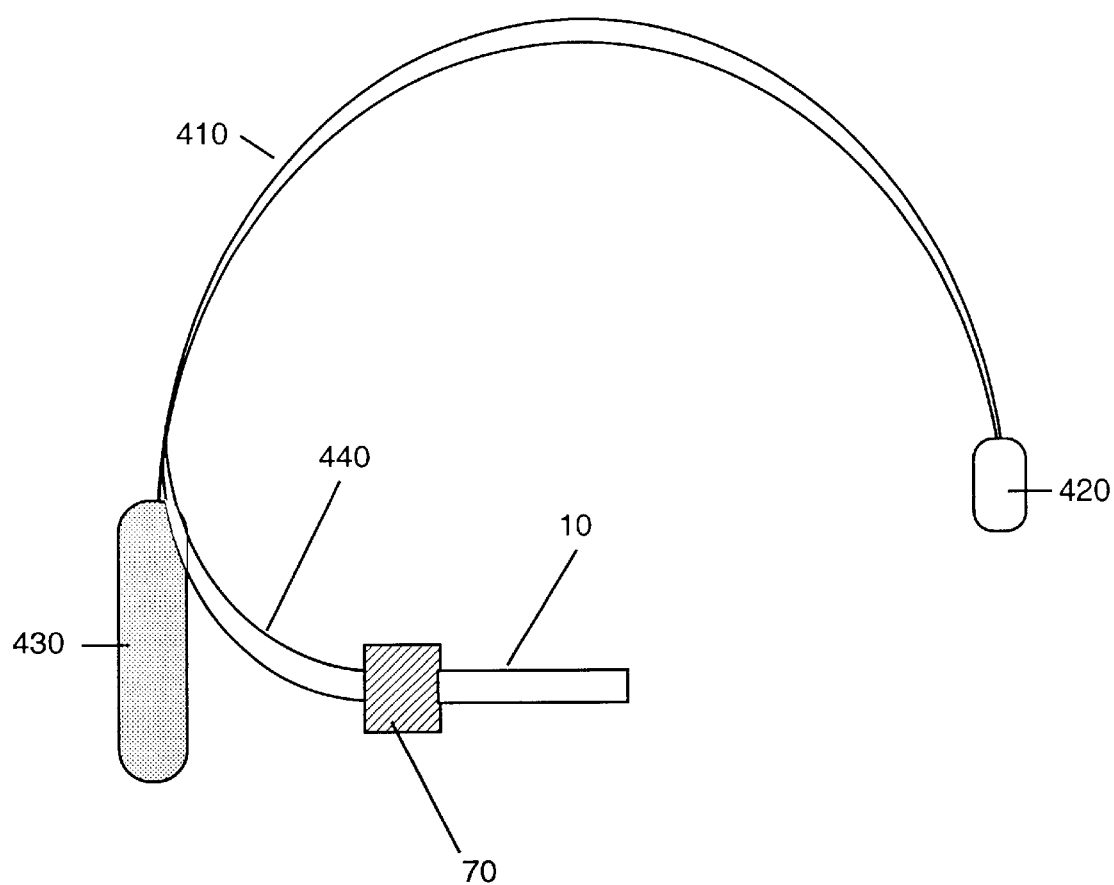
FIG. 10 is a schematic front view of the opto-mechanical support fixture with eyepiece and display mounted to a headband.

Alternatively, as shown in FIG. 10, the display unit may be mounted on a boom 440 that is attached to a headband 410. The headband may also be fitted with an earpiece 430 for receiving audio output signals. The boom may be provided with a microphone for audio input. A pad 420 may be attached to the headband, or may be replaced with an earpiece for stereo audio.

Figure 11:
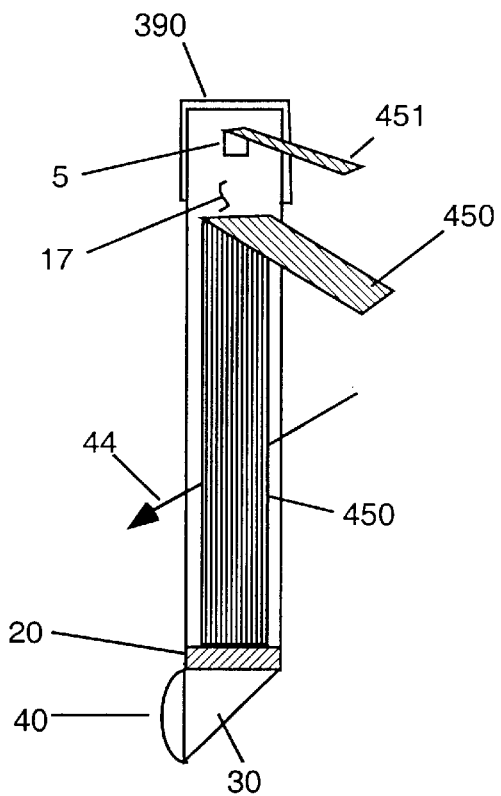
FIG. 11A is a bottom view of an opto-mechanical support fixture with eyepiece and display and circuitry.
FIG. 11B is a side view of the opto-mechanical support fixture of FIG. 11A.
Figure 11:
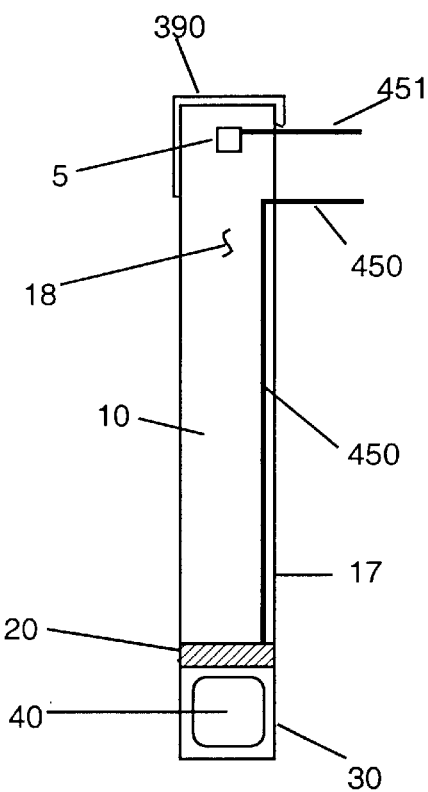

Referring to FIG. 9, the light conduit 10 that also serves as the mechanical support can serve as an effective light collector. A degree of collimation is made possible by a collimating lens 42 (FIG. 9) near the light source. Note that some of the light beyond the solid angle subtended by the display that ordinarily would not reach the display, is trapped by total internal reflection in the light conduit, thus improving the light collection efficiency of the conduit. Various techniques are possible including the use of specular metallic coatings or white diffuse reflectors near the illuminator, or even the complete embedding of the LED 5 within the material that forms the light conduit as shown in FIG. 11.

The display located at the eyepiece requires power, clock and data signals. These signals can be provided by attaching Kapton flexible circuitry 16 (FIG. 3) to the top surface or bottom surface of the support structure 10. The flexible circuit need not be clear, because it is thin (less than 1 mm) and does not block significantly the view of the ambient scene, and may be joined directly to the LCD by techniques known in the art. Alternatively, the signals can be provided by coaxial cables fixed to the top or bottom surface of the support 10.

The optical support fixture 10 is formed from glass by means known in the art, or by injection molding of clear plastics such as polymethylmethacrylate (acrylic) or polycarbonate, or by casting of plastics, polycarbonate resin, CR39, or epoxy resins or alternatively by machining of clear solid plastics. Organic materials generally provide lower weight than glass. FIG. 11 shows how the interconnect can be routed within a solid optical support fixture 10 formed by casting. FIG. 11a shows a view from the bottom showing the Kapton circuit 450 carrying signals to the LCD, and the Kapton circuit 451 carrying power to the LEDs 5. The Kapton circuit is embedded slightly below the surface. Note that the circuit 451 does not block rays from the ambient scene 44. The light source (LEDs) and the LCD are cast within the optical support fixture 10. FIG. 11b shows a side view, in which the interconnect circuits 450, 451 emerge from the optical support fixture 10 near the illuminator and thus can be housed within enclosure 70 (FIG. 9). A reflector 390 is placed around the optical support fixture 10 in the vicinity of the LEDs 5 to reflect light from the LEDs into the optical path to the display 20.

Figure 12:
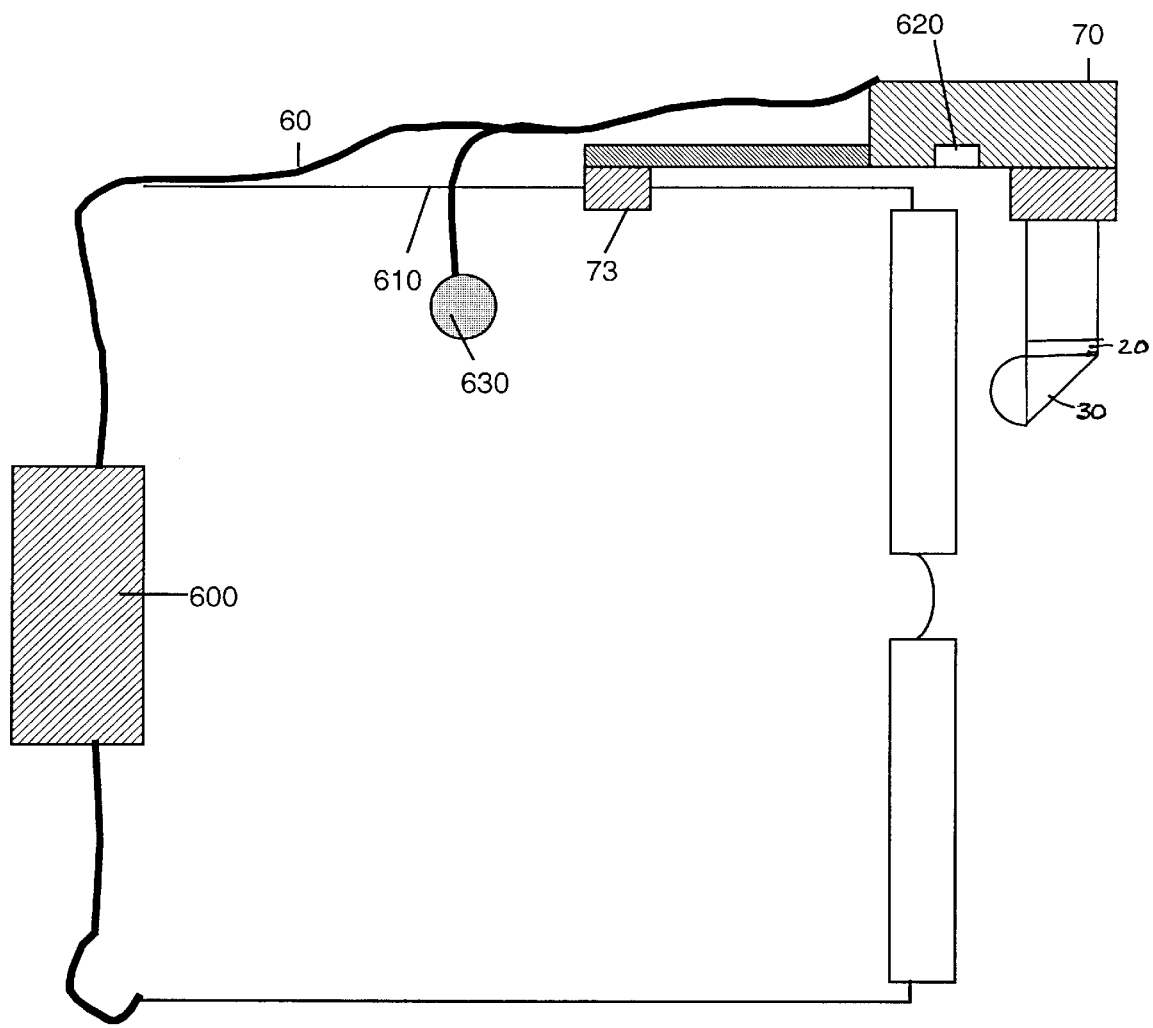
FIG. 12 is a schematic illustration of an opto-mechanical support fixture with eyepiece and display as an interface to a cellular telephone, computer, or personal digital assistant.

The display and illumination system may be provided with an ear piece and microphone to serve as an interface to a cellular telephone, computer, or personal digital assistant. FIG. 12 illustrates such a system. The housing 70 is provided with an opening 620 behind which is provided an audio microphone in communication with an RF circuit 600 via cable 60. An ear piece 630 to enable the user to hear audio output is provided and is in communication with the radio frequency (RF) circuit 600 by cable 60. RF circuit and power source (batteries) are located within an enclosure, comprising one of any number of commercial digital or analog RF devices including for example the Bluetooth interface commercialized by Ericsson and its partners. The RF circuit provides communication with a cellular telephone, computer, personal digital assistant, or other electronic device. Unit 600 is worn behind the head and cable 60 is also used to retain the spectacle frames 610 on the head of the user. Note that in some applications, the cellular telephone may be incorporated within unit 600 itself or even within the housing 70. Although this diagram shows the unit mounted to spectacle frames 610 by clamp 73, a similar device may be constructed for the headset shown in FIG. 10.

The invention is not to be limited by what has been particularly shown and described, except as indicated by the appended claims.

What is claimed is:

1. A compact display device for transmitting an image to a user's eye, the display device comprising:
   an opto-mechanical support fixture comprising an elongated member configured to allow passage of ambient light across a direction of elongation of the elongated member to a user's eye, the support fixture defining an illumination path along the elongated member;
   a display supported by the support fixture and operative to provide an image, the display located to receive illumination light on the illumination path; and
   an eyepiece assembly supported by the support fixture in proximity to the display to receive the image from the display and to direct the image to the user's eye, wherein the eyepiece comprises a polarization beam-splitter coating, a quarterwave plate, and a focusing mirror arranged so that polarized light from the display passes the beam-splitter coating and the quarterwave plate and is reflected from the focusing mirror to pass in the opposite direction through the quarterwave plate and is reflected from the beam-splitter coating toward the eye.

2. The device of claim 1, wherein the display comprises a transmissive liquid crystal display or a reflective liquid crystal display.

3. The device of claim 1, wherein the display comprises an active matrix liquid crystal display.

4. The device of claim 1, further comprising a light source disposed to provide illumination light on the illumination path to the display.

5. The device of claim 4, wherein the light source comprises an array of LEDs.

6. The device of claim 4, further comprising a collimating lens assembly supported by the support fixture to collimate light from the light source on the illumination path.

7. The device of claim 4, wherein the light source is fixed to an end of the support fixture.

8. The device of claim 4, wherein the light source is embedded within the support fixture.

9. The device of claim 1, wherein the support fixture is configured to relay light by total internal reflection along the elongated member.

10. The device of claim 1, wherein the illumination path is defined through free space.

11. The device of claim 1, wherein the display and eyepiece assembly are located so that light on the illumination path passes first through the display and then through the eyepiece assembly.

12. The device of claim 1, further comprising an enclosure housing circuits in electrical communication with the display and with a light source, the support fixture attached to the enclosure.

13. The device of claim 1, wherein the display is located less the 20 mm from the eyepiece assembly.

14. The device of claim 1, wherein the elongated member of the support fixture comprises a transparent element comprising clear side surfaces disposed in front of the user's eye to allow passage of ambient light through the clear side surfaces to the user's eye.

15. The device of claim 14, wherein the transparent element is hollow between the side surfaces.

16. The device of claim 14, wherein the transparent element further comprises top and bottom surfaces joining the side surfaces.

17. The device of claim 16, wherein at least one of the top and bottom surfaces is coated or covered or unpolished.

18. The device of claim 1, wherein the support fixture is formed of glass, polymethylmethacrylate, polycarbonate, CR39, or epoxy resins.

19. The device of claim 1, wherein the elongated member of the support fixture comprises a thin plate or a post.

20. The device of claim 1, further comprising miniature cabling supported by the support fixture and in electrical communication with the display.

21. The device of claim 20, wherein the miniature cabling comprises flexible circuitry or coaxial cables.

22. The device of claim 20, wherein the miniature cabling is fixed to a top or bottom surface of the support fixture.

23. The device of claim 20, wherein the miniature cabling is embedded within the support fixture.

24. The device of claim 1, wherein the eyepiece assembly comprises at least one reflecting surface disposed to redirect the image toward the user's eye and a lens located before the user's eye.

25. The device of claim 24, wherein the reflecting surface comprises a metal coated prism or a mirror.

26. The device of claim 1, wherein the eyepiece assembly magnifies the image.

27. The device of claim 1, wherein the display comprises an emissive display.

28. The device of claim 27, wherein the emissive display comprises an active matrix electroluminescent display.

29. The device of claim 27, wherein the eyepiece assembly comprises a reflecting surface arranged to receive the image from the emissive display and direct the image to the user's eye.

30. The device of claim 29, wherein the eyepiece assembly further comprises a lens assembly.

31. The device of claim 29, wherein the eyepiece assembly further comprises a lens assembly.

32. The device of claim 1, further comprising a mounting device configured to mount the support to spectacle frames or a headband.

33. The device of claim 1, further comprising a housing supporting circuits in electrical communication with the display, the support fixture attached to the housing.

34. The device of claim 33, further including a microphone within the housing.

35. The device of claim 33, further comprising an earpiece operative to receive audio output signals.

36. The device of claim 1, further comprising a boom attached to a headband, the support attached to the boom.

37. The device of claim 36, further comprising a microphone mounted to the boom.

38. The device of claim 36, wherein the headband includes an earpiece operative to receive audio output signals.

39. A cellular telephone in communication with the display device of claim 1.

40. A computer in communication with the display device of claim 1.

41. A personal digital assistant in communication with the display device of claim 1.

42. A compact display device for transmitting an image to a user's eye, the display device comprising:

an opto-mechanical support fixture comprising an elongated member configured to allow passage of ambient light across a direction of elongation of the elongated member to a user's eye, the support fixture defining an illumination path along the elongated member;

a display supported by the support fixture and operative to provide an image, the display located to receive illumination light on the illumination path; and an eyepiece assembly supported by the support fixture in proximity to the display to receive the image from the display and to direct the image to the user's eye, wherein the eyepiece assembly comprises a polarization beam splitter cube and a lens, and the eyepiece assembly and the display are arranged so that one linear polarization of light on the illumination path passes through the beam splitter cube to the display, and the display reflects and rotates the polarization of the light, and the light is reflected at the beam splitter cube through the lens to the user's eye.

43. A compact display device for transmitting an image to a user's eye, the display device comprising:

a mechanical support fixture comprising an elongated member configured to allow passage of ambient light across a direction of elongation of the elongated member to a user's eye, the support fixture defining an illumination path along the elongated member;

a display supported at one end of the support fixture and operative to provide an image, the display located to receive illumination light on the illumination path;

an eyepiece assembly supported by the support fixture in proximity to the display to receive the image from the display and to direct the image to the user's eye; and a light source supported at an opposite end of the support fixture to provide illumination light on the illumination path to the display, whereby the ambient light passes across the illumination path between the light source and the display.

44. The device of claim 43, wherein the display comprises a transmissive liquid crystal display or a reflective liquid crystal display.

45. The device of claim 43, wherein the display comprises an active matrix liquid crystal display.

46. The device of claim 43, wherein the light source comprises an array of LEDs.

47. The device of claim 43, further comprising a collimating lens assembly supported by the support fixture to collimate light from the light source on the illumination path.

48. The device of claim 43, wherein the light source is embedded within the support fixture.

49. The device of claim 43, wherein the support fixture comprises an optical member, configured to relay light internally.

50. The device of claim 43, wherein the support fixture is configured to relay light by total internal reflection along the elongated member.

51. The device of claim 43, wherein the illumination path is defined through free space.

52. The device of claim 43, wherein the eyepiece assembly comprises a polarization beam-splitter coating, a quarterwave plate, and a focusing mirror arranged so that polarized light from the display passes the beam-splitter coating and the quarterwave plate and is reflected from the focusing mirror to pass in the opposite direction through the quarterwave plate and is reflected from the beam-splitter coating toward the eye.

53. The device of claim 43, wherein the display and the eyepiece assembly are located so that light on the illumination path passes first through the display and then through the eyepiece assembly.

54. The device of claim 43, wherein the eyepiece assembly comprises a polarization beam splitter cube and a lens, and the eyepiece assembly and the display are arranged so that one linear polarization of light on the illumination path passes through the beam splitter cube to the display, and the display reflects and rotates the polarization of the light, and the light is reflected at the beam splitter cube through the lens to the user's eye.

55. The device of claim 43, further comprising an enclosure housing circuits in electrical communication with the display and with a light source, the support fixture attached to the enclosure.

56. The device of claim 43, wherein the display is located less than 20 mm from the eyepiece assembly.

57. The device of claim 43, wherein the elongated member of the support fixture comprises a transparent element comprising clear side surfaces disposed in front of the user's eye to allow passage of ambient light through the clear side surfaces to the user's eye.

58. The device of claim 57, wherein the transparent element is hollow between the side surfaces.

59. The device of claim 58, wherein the transparent element further comprises top and bottom surfaces joining the side surfaces.

60. The device of claim 59, wherein at least one of the top and bottom surfaces is coated or covered or unpolished.

61. The device of claim 43, wherein the support fixture is formed of glass, polymethylmethacrylate, polycarbonate, CR39, or epoxy resins.

62. The device of claim 43, wherein the elongated member of the support fixture comprises a thin plate or a post.

63. The device of claim 43, further comprising miniature cabling supported by the support fixture and in electrical communication with the display.

64. The device of claim 63, wherein the miniature cabling comprises flexible circuitry or coaxial cables.

65. The device of claim 63, wherein the miniature cabling is fixed to a top or bottom surface of the support fixture.

66. The device of claim 63, wherein the miniature cabling is embedded within the support fixture.

67. The device of claim 43, wherein the eyepiece assembly comprises at least one reflecting surface disposed to redirect the image toward the user's eye and a lens located before the user's eye.

68. The device of claim 67, wherein the reflecting surface comprises a metal coated prism or a mirror.

69. The device of claim 43, wherein the eyepiece assembly magnifies the image.

70. The device of claim 43, wherein the display comprises an emissive display.

71. The device of claim 70, wherein the emissive display comprises an active matrix electroluminescent display.

72. The device of claim 70, wherein the eyepiece assembly comprises a reflecting surface arranged to receive the image from the emissive display and direct the image to the user's eye.

73. The device of claim 43, further comprising a mounting device configured to mount the support to spectacle frames or a headband.

74. The device of claim 43, further comprising a housing supporting circuits in electrical communication with the display, the support fixture attached to the housing.

75. The device of claim 74, further including a microphone within the housing.

76. The device of claim 74, further comprising an earpiece operative to receive audio output signals.

77. The device of claim 43, further comprising a boom attached to a headband, the support attached to the boom.

78. The device of claim 77, further comprising a microphone mounted to the boom.

79. The device of claim 77, wherein the headband includes an earpiece operative to receive audio output signals.

80. A cellular telephone in communication with the display device of claim 43.

81. A computer in communication with the display device of claim 43.

82. A personal digital assistant in communication with the display device of claim 43.

* * * * *

UNITED STATES PATENT AND TRADEMARK OFFICE
CERTIFICATE OF CORRECTION

PATENT NO. : 6,618,099 B1 Page 1 of 1
APPLICATION NO. : 09/588674
DATED : September 9, 2003
INVENTOR(S) : Mark B. Spitzer It is certified that error appears in the above-identified patent and that said Letters Patent is hereby corrected as shown below:

Column 7, claim 11, lines 1 and 2 "and eyepiece" should read --and the eyepiece--; and Column 9, claim 59, line 39, "claim 58," should read --claim 57, --.

Signed and Sealed this

Fifth Day of June, 2007

JON W. DUDAS
*Director of the United States Patent and Trademark Office*